United States Patent [19]
Jung

[11] Patent Number: 5,825,423
[45] Date of Patent: Oct. 20, 1998

[54] APPARATUS FOR DETECTING MOTION VECTORS USING MOVING OBJECT PATTERNS

[75] Inventor: Hae-Mook Jung, Seoul, Rep. of Korea

[73] Assignee: Daewoo Electronics Co., Ltd., Seoul, Rep. of Korea

[21] Appl. No.: 770,367

[22] Filed: Nov. 27, 1996

Related U.S. Application Data

[63] Continuation of Ser. No. 225,216, Apr. 18, 1994, abandoned.

[30] Foreign Application Priority Data

Apr. 9, 1993 [KR] Rep. of Korea .................. 93-5967

[51] Int. Cl.$^6$ ..................................................... H04N 7/32
[52] U.S. Cl. .......................................... 348/413; 348/699
[58] Field of Search .................................... 348/384, 390, 348/400–402, 407, 409–413, 415, 416, 420, 699, 702; 382/232, 236, 238; H04N 7/137

[56] References Cited

U.S. PATENT DOCUMENTS

| | | | |
|---|---|---|---|
| 4,862,264 | 8/1989 | Wells et al. | 348/416 |
| 4,864,398 | 9/1989 | Avis et al. | 348/416 |
| 4,987,489 | 1/1991 | Hurley et al. | 348/702 |
| 5,012,337 | 4/1991 | Gillard | 348/699 |
| 5,016,102 | 5/1991 | Avis | 348/699 |
| 5,142,361 | 8/1992 | Tayama et al. | 348/699 |
| 5,173,771 | 12/1992 | Kitazato | 348/416 |
| 5,200,820 | 4/1993 | Gharavi | 348/699 |

*Primary Examiner*—Richard Lee
*Attorney, Agent, or Firm*—Anderson Kill & Olick, P.C.

[57] ABSTRACT

An apparatus for estimating motion vectors between a current frame and a reference frame of video signals employs a set of moving object patterns, each of the, moving object patterns representing a predetermined pattern of movement for at least one moving object and comprises; unit for storing the set of moving object patterns; unit for dividing the current frame into a multiplicity of search blocks of an identical size; unit for producing a search region from the reference frame corresponding to one of the search blocks; unit for producing a plurality of candidate blocks of the identical size in the search region; and unit for comparing the one of the search blocks with the plurality of candidate blocks in the search region on the basis of each of the moving object patterns to produce a codeword index for a selected moving object pattern and a motion vector representing the displacement of one of the moving object(s) defining the selected moving object pattern.

4 Claims, 5 Drawing Sheets

FIG. 1D

APPARATUS FOR DETECTING MOTION VECTORS USING MOVING OBJECT PATTERNS

This is a continuation of U.S. application Ser. No. 08/225,216, filed Apr. 18, 1994 now abandoned.

FIELD OF THE INVENTION

The present invention relates to an apparatus for approximating motion vectors between two successive frames of video signals; and, more particularly, to an improved apparatus for accurately representing the motion vectors using moving object patterns.

DESCRIPTION OF THE PRIOR ART

In digital processing systems such an video-telephone, teleconference and high definition television systems, a large amount of digital data is required to define each frame of video signals since each line of an image frame comprises a sequence of digital data referred to as pixels However, the available frequency bandwidth of a conventional transmission channel to transmit the data is limited. Therefore, it has become necessary to reduce the substantial amount of data by way of employing various data compression techniques.

Interframe coding technique is one of the effective coding methods to compress data in video sequences. Motion-compensated coding, especially, has been proposed to improve the efficiency of image coding for the transmission of compressed data. This technique is used to predict a current frame data from a previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types; pixel recursive algorithms(e.g., A. N. Netravali et al, "Motion Compensated Television Coding: Part I", BSTJ, 58 pp. 631–670 (March 1979); and K. A. Probhu et al, "Pal-Recursive Motion Compensated Color Coding", *Proceedings of ICC*, 88 pp. 26.8.1–26.8.5, (June 1982)); and block matching algorithms (s, e.g., J. R. Jain et al,. "Displacement Measurement and Tts Application in Interframe Image Coding", *IERR Transactions on Communications*, COM-29 No. 12, pp. 1799–1808. (December 1981)). The present invention is primarily concerned with the block matching algorithms.

In a block matching algorithm, a current frame is divided into a plurality of search blocks. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out the similarity measurement between the search block of the current frame and one of the candidate blocks in the search region. And a motion vector, by definition, represents the displacement between the search block and a candidate block which yields a minimum "error" or difference.

Inasmuch as the prior art block matching algorithm is structured for one search block to have only one motion vector, in case two or more different motions exist in one search block, the algorithm is not equipped to handle the situation properly.

SUMMARY OF THE INVENTION

It is, therefore, a primary object of the present invention to provide an improved apparatus which is capable of accurately representing different motions existing in one block through the use of a motion vector pattern.

In accordance with one aspect of the invention, there is provided an apparatus for estimating motion vectors between a current frame and a reference frame of video signals using a set of moving object patterns, each in said set of moving object patterns representing a predetermined pattern of movement for at least one moving object, comprising: means for storing the set of moving object patterns; means for dividing the current frame into a multiplicity of search blocks of an identical size; means for producing a search region from the reference frame corresponding to one of the search blocks; means for producing a plurality of candidate blocks of said identical size in the search region; and means for comparing said one of the search blocks with said plurality of candidate blocks in the search region on the basis of each of the moving object patterns to produce a codeword index for a selected moving object pattern and a motion vector representing the displacement of one of the moving object(s) defining the selected moving object pattern.

BRIEF DESCRIPTION OF THE DRAWINGS

The above and other objects and features of the present invention will become apparent from the following description and the accompanying drawings, in which:

FIG. 1D is an exemplary set of codewords representing a number of moving object patterns;

DETAILED DESCRIPTION OF THE PREFERRED EMBODIMENTS

Figure 1A:
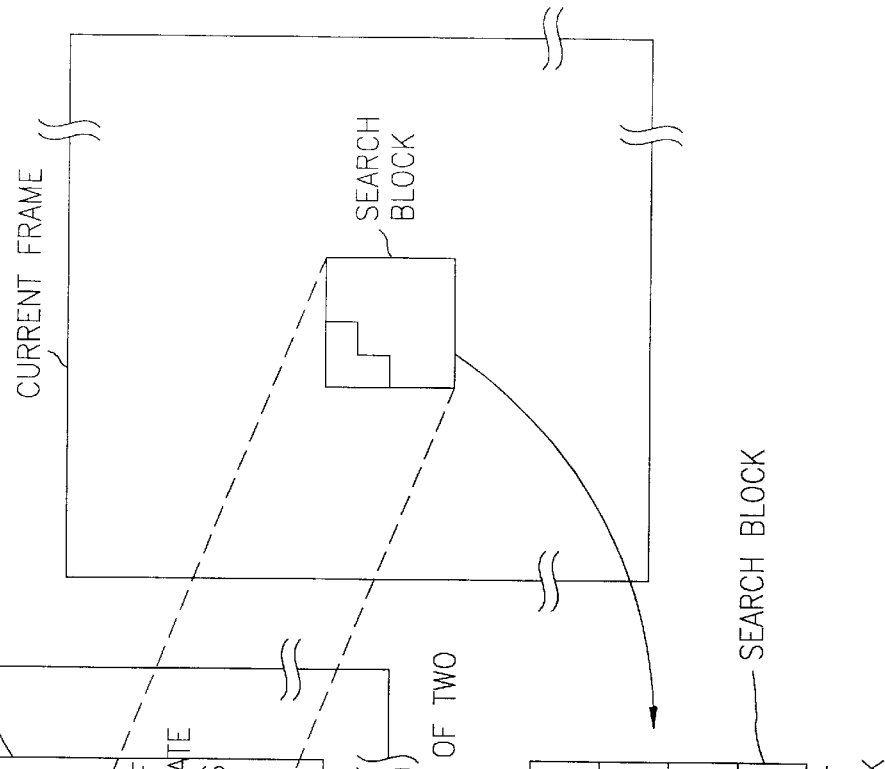
FIGS. 1A and 1B schematically illustrate a sequence of current frame and reference frames.
Figure 1B:
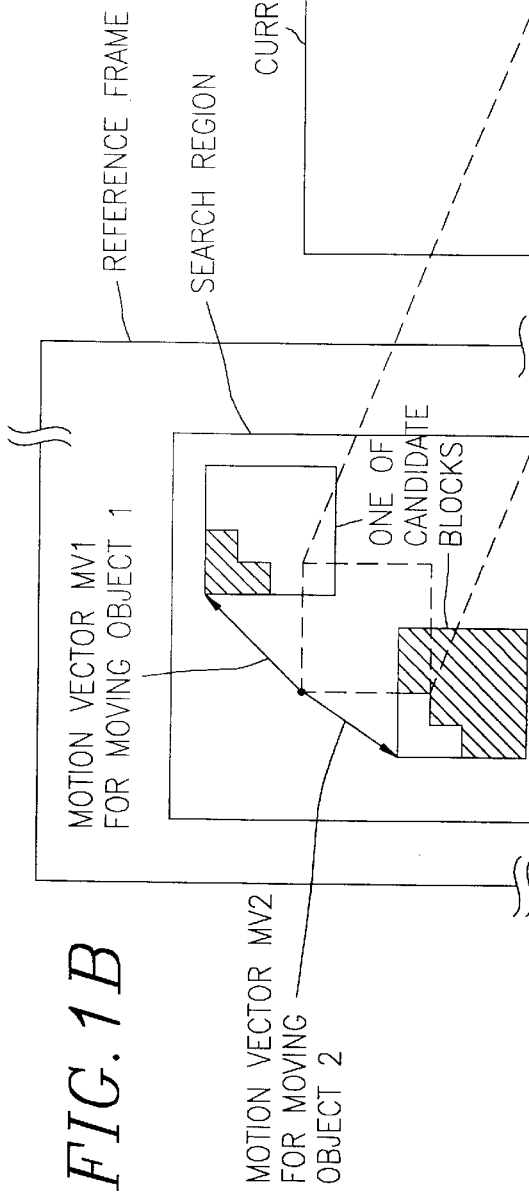

FIG. 1A schematically illustrates a sequence of a current frame and a reference frame (adjacent or previous frame) to be transmitted from a transmitter (not shown) to a receiver (not shown). Generally, an interframe coding technique using motion estimation and compensation is used to achieve a significant data compression by utilizing the redundancies between the successive frames. That is to say, if the difference between the current frame and the reference frame is induced by a displacement or motion of an object and this difference is confined to a relatively small region within a frame, it is not necessary to transmit the entire image data of a current frame to the receiver. Instead, it may suffice to transmit the displacement information, i.e., motion vectors to the receiver. The receiver then reconstructs the current frame from its reference frame whose image data is stored in a frame memory within the receiver, utilizing the motion vectors.

As shown in FIG. 1A, to determine such motion vectors in accordance with this invention, the current frame is divided into a plurality of search blocks of an identical size, each comprising M×N pixels. For the purpose of illustration, it is assumed that M and N are both an equal number of 15 for each search block of pixels in the current frame. And its reference frame includes a corresponding number of search regions (because once a search block in the current frame is selected, one can readily identify a search region in the reference frame corresponding thereto); and each search region is made to have a multiplicity of candidate blocks of the identical size, with some or all of the candidate blocks likely to have overlapping portions with their neighbors.

Figure 1C:
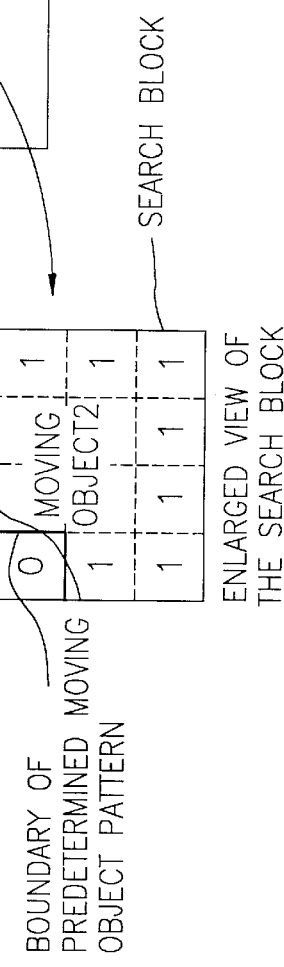
FIG. 1C shows an enlarged view of a given search block shown in FIG. 1A.

As shown in the enlarged view of a given search block in FIG. 1C, two different moving objects are chosen to exist in the given search block. And also, there are two boundaries therebetween: one boundary is the actual boundary of the two moving objects and the other is a rough boundary approximated to the actual boundary according to a moving object pattern. The moving object pattern is selected from a set of moving object patterns which are designed to serve as a guide for regionalizing or approximating the actual boundary. The set of moving object patterns will be described hereinafter with reference to FIG. 1D.

As shown in the enlarged view of FIG. 1C, the moving object pattern is composed of two pattern numbers. One pattern #0 represents the moving object 1 and the other pattern #1 shows the moving object 2. A small block, e.g., 4×4 pixels, is chosen as the unit of the moving object pattern.

To determine a set of motion vectors for the given search block of FIG. 1A, the given search block is compared with all of the candidate blocks included in the corresponding search region, on a block-by-block basis, to calculate the similarities therebetween. In carrying out the similarity measurement, various error functions may be employed. Among the error functions, the Mean Absolute Error(MAE) function is often used because it offers a good trade-off between complexity and efficiency. At this time, the similarities are calculated between only two groups of small blocks for each of pattern #0 and pattern #1, respectively. Therefore, in a search region corresponding to the given search block, there exist two different motion vectors MV1 and MV2 for the moving objects The motion vector MV1 represents the moving object is 1, and the motion vector MV2 relates to the moving object 2.

Figure 1D:
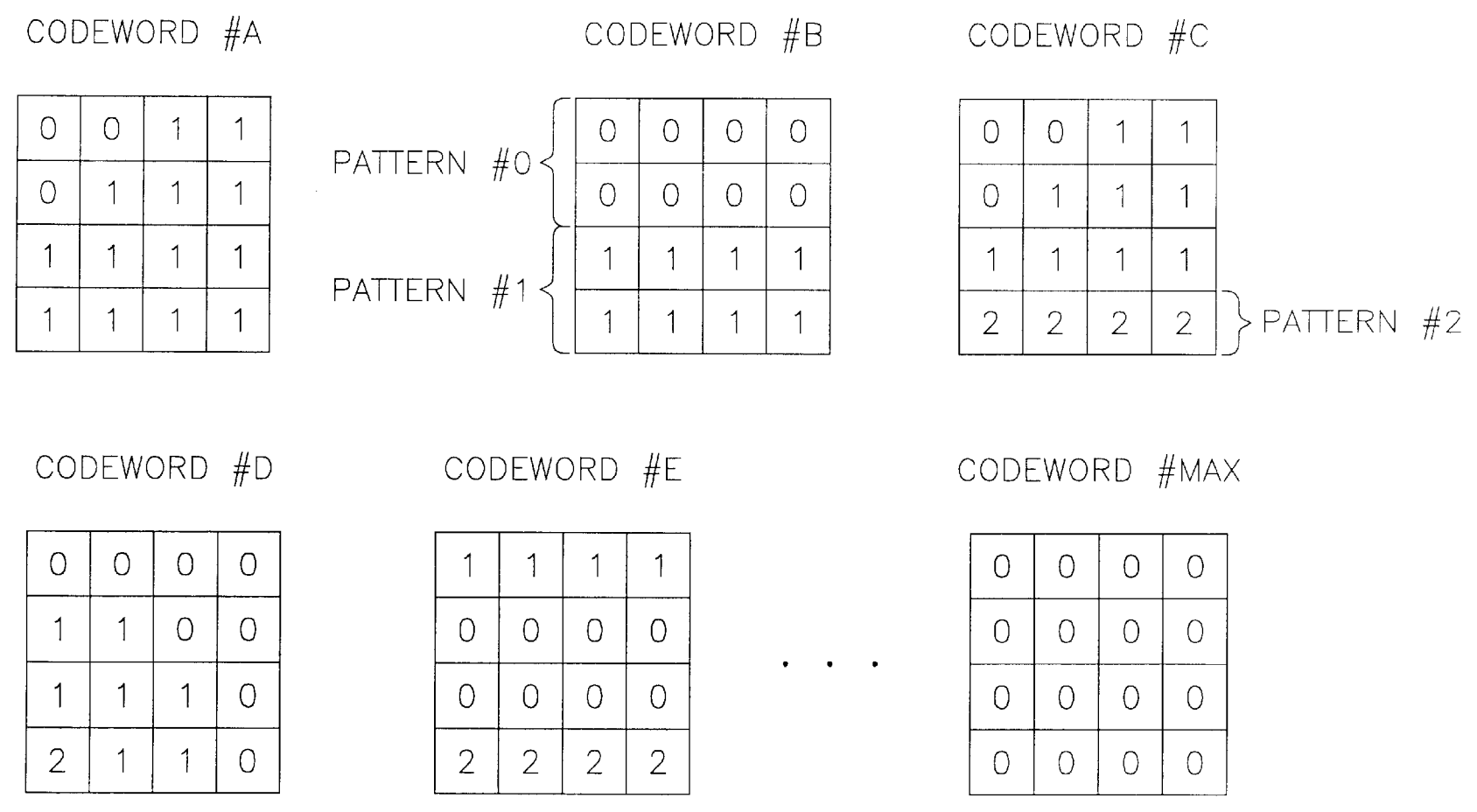

FIG. 1D is an exemplary set of codewords representing a number of moving object patterns. As shown in FIG. 1D, codeword indices, i.e., the number of codewords #A and #B are composed of two pattern numbers #0 and #1; and codeword indices #C to #E comprise three pattern numbers #0, #1 and #2. And, the codeword index #MAX has only one pattern number#0.

Figure 2:
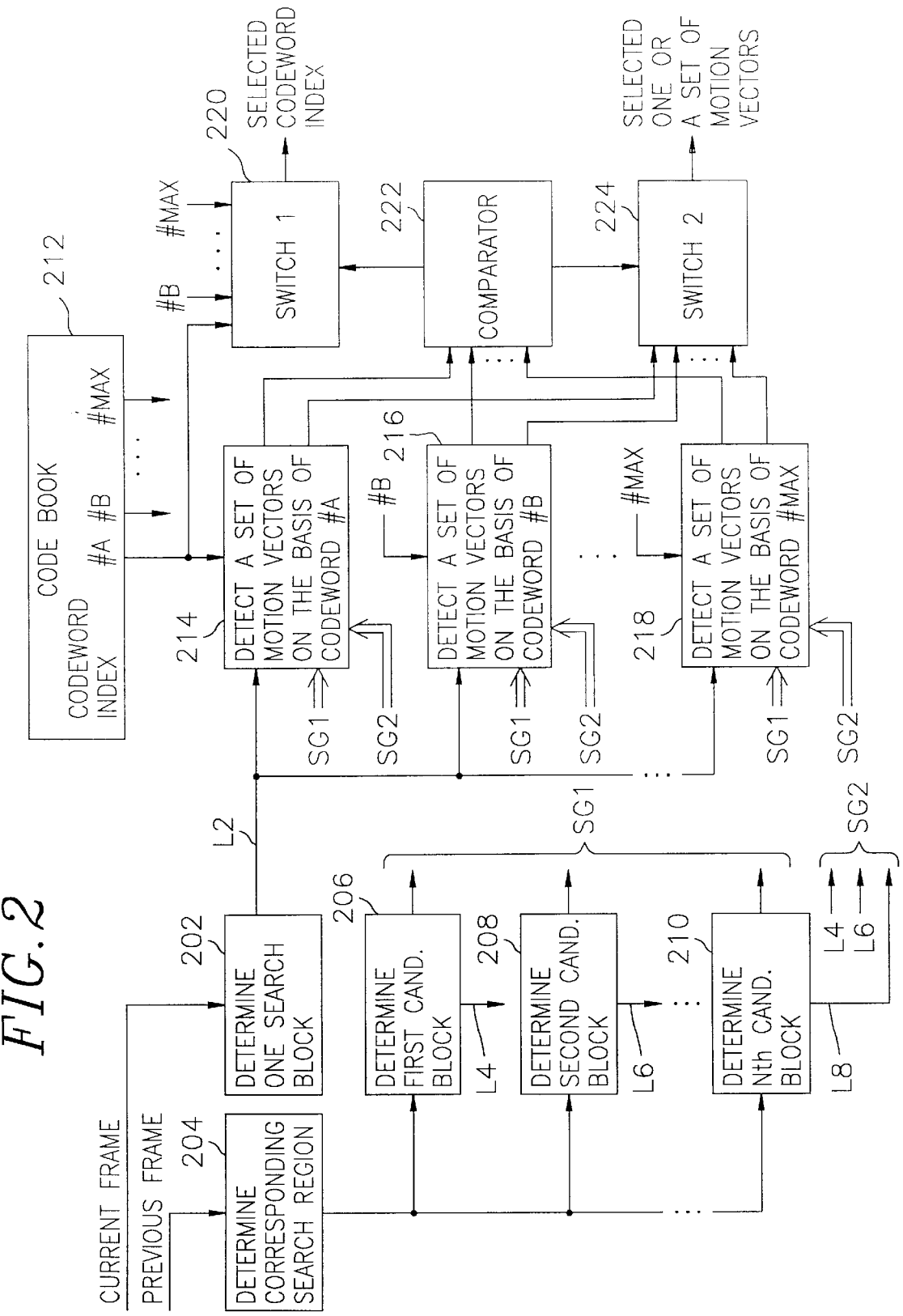
FIG. 2 shows an block diagram of an embodiment of the invention for determining motion vectors between a current frame and its reference frame.

FIG. 2 shows a block diagram of an embodiment of the invention for determining motion vectors between a current frame and its reference frame. As shown in FIG. 2, an input signal for the current frame is provided to a block 202. In the block 202, one search block is determined. The output signal of the block 202 is provided through a line L2 to a number of motion vector detection blocks 214, 216 and 218. On the other hand, an input signal for the previous frame is provided to a block 204. In the block 204, there is selected a search region which corresponds to the search black predetermined at the block 202. The output signal of the block 204 is provided to a number of blocks 206, 208 and 210. The block 206 determines a first candidate block of all possible candidate blocks which are included in the search region. Similarly, the block 208 and the block 210 determine a second candidate block and an Nth candidate block, respectively. Each of the blocks 206, 208 and 210 generates two signals: one is signal representing a candidate block; and the other is a signal indicating the relative position between the candidate block and the given search block, i.e., a motion vector. Each of the motion vectors is outputted through lines L4, L6 and L8, respectively. Two groups of output signals SG1's made by all of the candidate block signals and SG2's made by all of the motion vectors from the lines L4, L6 and L8 are provided to each of the motion vector detection blocks 214, 216 and 218, respectively.

In each of the motion vector detection blocks 214, 216 and 218, at least one motion vector is detected on the basis of each of the codewords which are provided from a code book block 212 containing a set of codewords such an described in FIG. 1D. Each of the codewords from the code book block 212 is provided to each of the motion vector detection blocks 214, 216 and 218. On the other hand, the indices of the codewords #A, #B and # MAX are provided to a first switch 220.

The operation of the motion vector detection blocks is s described hereinafter with reference to FIG. 3. The output signals from each of the motion vector detection blocks are an average of the error signals and a set of motion vectors for each of the codeword, which will also be described hereinafter with reference to FIG. 3. Since the codeword #MAX has only one moving object pattern #0 as shown in FIG. 1D, the output from the detection block 218 has one error signal and one motion vector. Averaged error signals from the blocks 214 and 216 and one error signal from the block 218 are provided to a comparator 222. And, the respective sets of motion vectors from the blocks 214 and 216 and one motion vector from the block 218 are provided to a second switch 224. In the comparator 222, all of the input error signals are compared to provide a selection signal to the first and the second switches 220 and 224, simultaneously. The first switch 220 selects a codeword index in response to the selection signal from the comparator 222 and the second switch 224 selects a set of motion vectors in response to the selection signal from the comparator 222.

Figure 3:
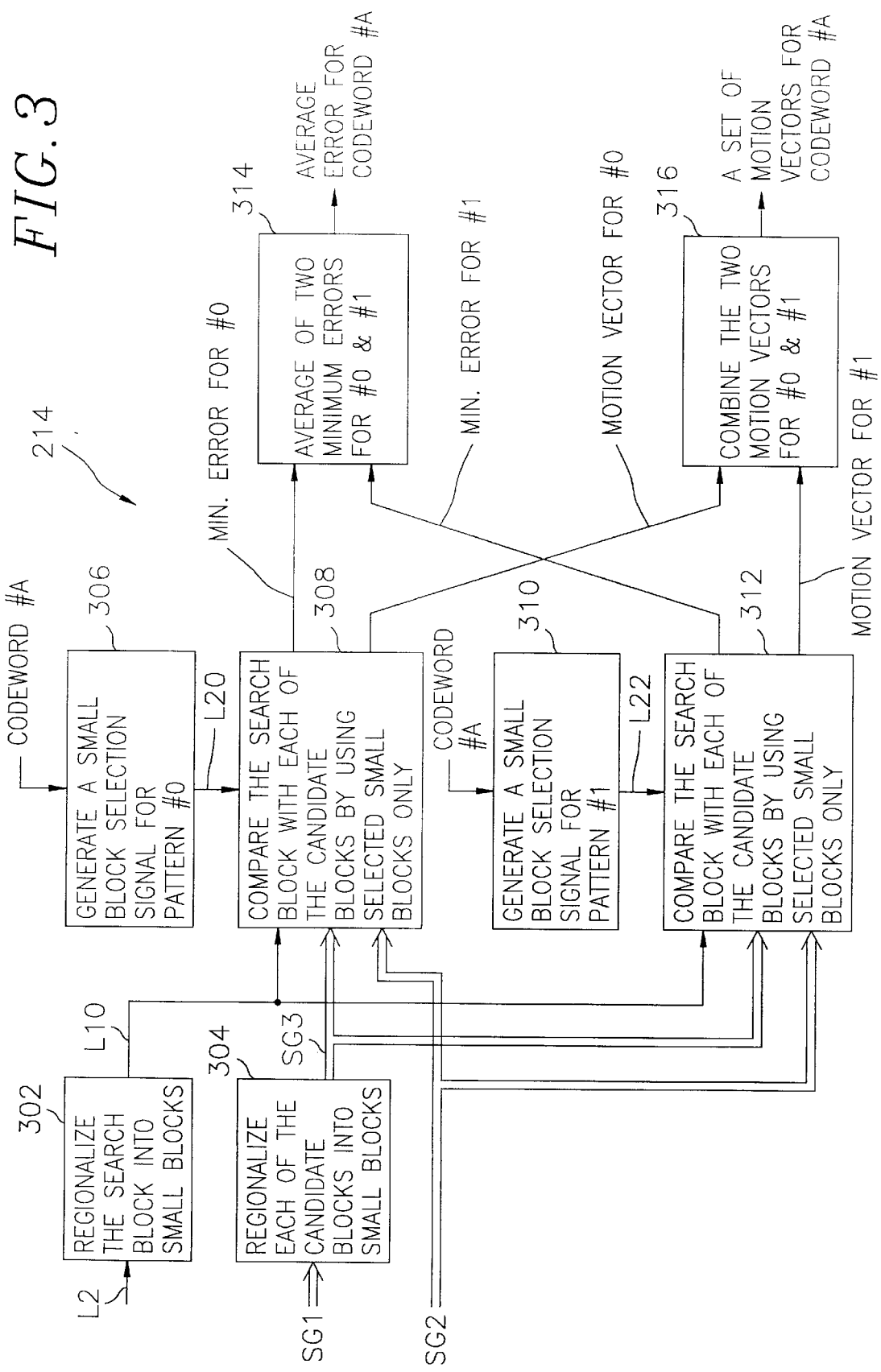
FIG. 3 represents a detailed block diagram of the motion vector detection block 214 of FIG. 2.

FIG. 3 is a detailed block diagram of the motion vector detection block 214 of FIG. 2. As shown in FIG. 3, a given search block in provided through a line L2 to a regionalization block 302. In the block 302, the search block is regionalized to a number of small blocks. The output signal from the block 302 is provided through a line L10 to blocks 308 and 312. On the other hand, all of the candidate block signals SG1 are provided to a block 304 wherein each of the candidate blocks is regionalized into the small blocks.

The output signals SG3's from the block 304 are provided to the blocks 308 and 312. Further, to each of the blocks 308 and 312, the motion vector signals SG2 are provided. In block 306, in response to codeword #A, there is generated a small block selection signal for pattern #0, which is provided through line L20 to the block 308. Similarly, in block 310, in response to the codeword #A, there is generated a small block selection signal for pattern #1, which is provided is through line L22 to the block 312.

In the block 308, in response to the selection signal for pattern #0, there are selected a group of small blocks which are contained in the given search block and all of the candidate blocks; and then the search block is compared with each of the candidate blocks by using the selected small blocks only.

The operation of the block 308 is described hereinafter with reference to FIG. 4 The output signals from the block 308 are a minimum error signal and a motion vector for pattern #0. The minimum error signal and the motion vector for pattern #0 are provided to blocks 314 and 316, respectively.

Similarly, in the block 312, in response to the selection signal for pattern #1 from the block 310, a group of small blocks contained in the given search block and all of the candidate blocks are selected, and then the search block is compared with each of the candidate blocks by using the selected small blocks only. The output signals from the block 312 are a minimum error signal and a motion vector for pattern #1. The minimum error signal and the motion vector for pattern #1 are provided to blocks 314 and 316, respectively.

In the block 314, averaging of two minimum errors for pattern #0 and #1 is accomplished. And then, the averaged value is generated as an average error for codeword #A. In the block 316, two motion vectors for #0 and #1 are combined to generate a set of motion vectors for codeword #A.

Figure 4:
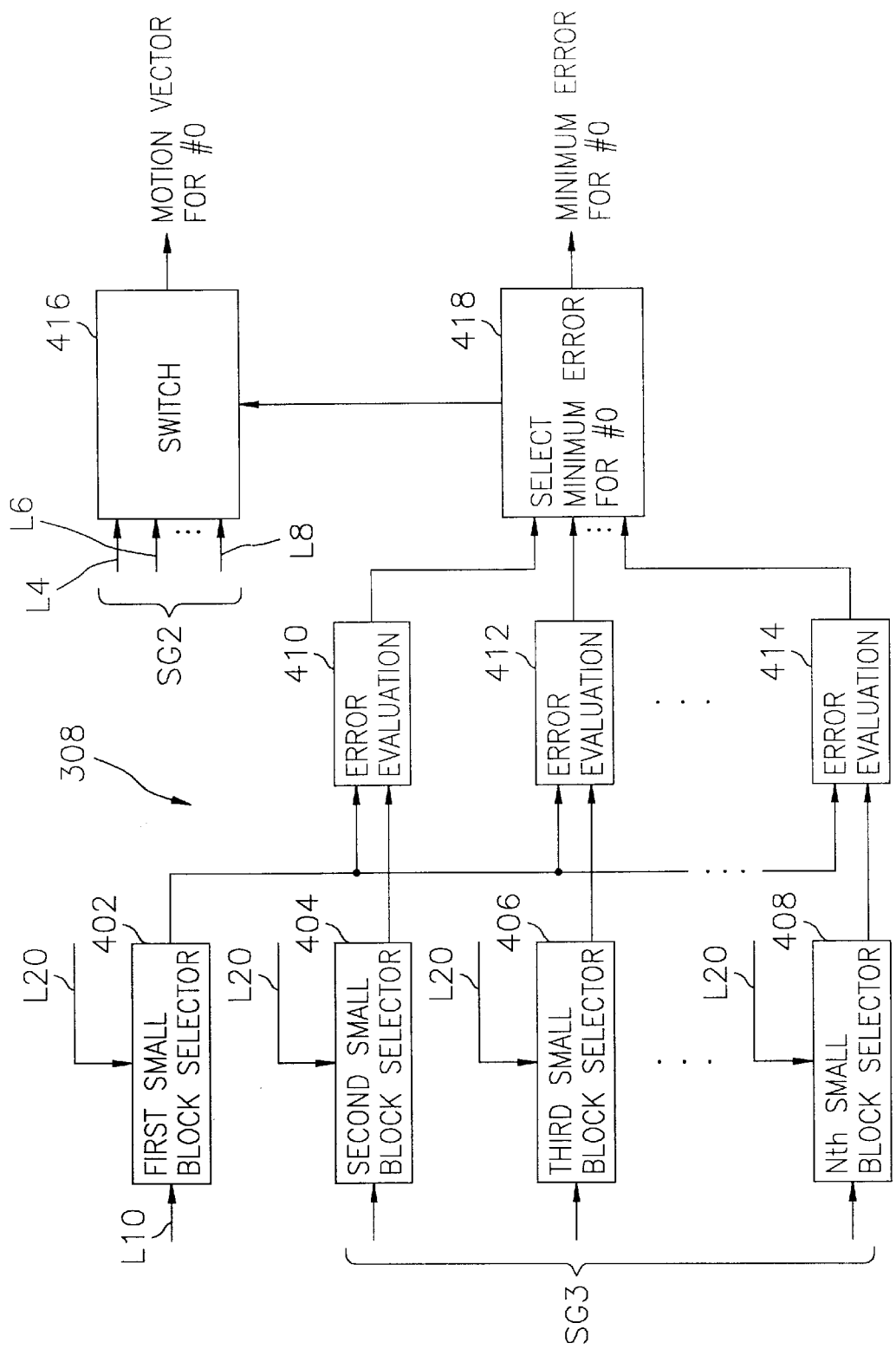
FIG. 4 depicts a detailed block diagram of the block 308 of FIG. 3.

FIG. 4 is a detailed block diagram of the block 308 of FIG. 3. As shown in FIG. 4, through a line L10, the regionalized small blocks of the given search block are provided to a first small block selector 402. In the block 402, in response to a small block selection signal for pattern #0 through a line L20, a group of small blocks is selected as pattern #0. And then, the group of small blocks for pattern #0 is provided to error evaluation blocks 410, 412 and 414.

On the other hand, each signal of the regionalized candidate block signal group S23 is provided to each small block selector 404, 406 and 408. In each of the blocks 404, 406 and 408, in response to the small block selection signal for pattern #0 through the line L20, a group of small blocks contained in each candidate block is selected as pattern #0. And then, said each group of small blocks for pattern #0 is provided to each of the error evaluation blocks 410, 412 and 414, respectively.

In the error evaluation blocks 410, 412 and 414, a group of small blocks contained in a given search block is compared with another group of small blacks contained in each of the candidate blocks to calculate the similarity thereof. Generally, in carrying out the similarity measurement, the Mean Absolute Error (MAE) function is used. Each output signal from the error evaluation blocks 410, 412 and 414 is provided to a block 418. In the block 418, the minimum error for #0 is selected and a switch control signal for a switch 416 is generated. The switch 416, in response to the switch control signal form the block 418, selects a motion vector for #0 from the motion vector signal group SG2.

While the present invention has been described with reference to the particular embodiments, it will ha apparent to those skilled in the art that various changes and modifications may be made without departing from the spirit and scope of the invention as defined in the following claims.

What is claim is:

1. An apparatus for detecting a number of sets of motion vectors between a current frame and a reference frame of video signals, wherein the current frame is divided into a plurality of search blocks of an identical size and the reference frame is made to include a corresponding number of search regions, each search region having a plurality of candidate blocks of said identical size, the apparatus comprising:

means for storing a set of codewords, each having a size identical to a search block, wherein each of the codewords is indexed by a codeword number and includes one or more pattern numbers, each pattern number representing a predicted moving object;

a plurality of motion estimation means, each of the motion estimation means, in response to a codeword number, for estimating a set of candidate motion vectors and an average error signal for a given search block, wherein the set of candidate motion vectors and the error signal are obtained from the given search block and the corresponding search regions rearranged in accordance with one or more pattern numbers contained in the codeword number; and selection means for selecting a set of motion vectors for the given search block from a plurality of sets of candidate motion vectors to generate the set of motion vectors and a corresponding codeword number for the given search block, wherein the set of the motion vectors entails a minimum average error signal.

2. The apparatus as recited in claim 1, wherein said each of the motion estimation means includes:

means for dividing the given search block and each of the corresponding candidate blocks into a plurality of small search and candidate blocks, respectively;

means for grouping the small search and candidate blocks into a set of search and candidate groups according to said codeword number, respectively;

a number of motion estimation means, each for comparing a search group with the corresponding candidate groups to generate a candidate motion vector and minimum error signal for the search group; and means for generating the set of candidate motion vectors and the average error signal for the given search block, wherein the error signal for the given search block is obtained by averaging the minimum error signals for the search groups from the number of motion estimation means.

3. The apparatus as recited in claim 2, wherein said number of motion estimation means is smaller than 3.

4. The apparatus as recited in claim 3, wherein each of said plurality of small search blocks includes at least one pixel.

* * * * *

UNITED STATES PATENT AND TRADEMARK OFFICE

CERTIFICATE OF CORRECTION

PATENT NO.    : 5,825,423

DATED         : October 20, 1998

INVENTOR(S)   : Hae-Mook Jung

It is certified that error appears in the above-identified patent and that said Letters Patent is hereby corrected as shown below:

On title page,

Related U.S. Application

[63] Continuation of Ser. No. 225,216,   Apr. 8, 1994

Signed and Sealed this

Twentieth Day of April, 1999

Attest:

Q. TODD DICKINSON

*Attesting Officer*            *Acting Commissioner of Patents and Trademarks*